June 16, 1942.  C. E. TANNEWITZ  2,286,589
BLADE GRABBER FOR BAND SAWS
Filed Oct. 28, 1940  2 Sheets-Sheet 1

INVENTOR.
Carl E. Tannewitz
BY Earl F. Chappell
ATTORNEYS.

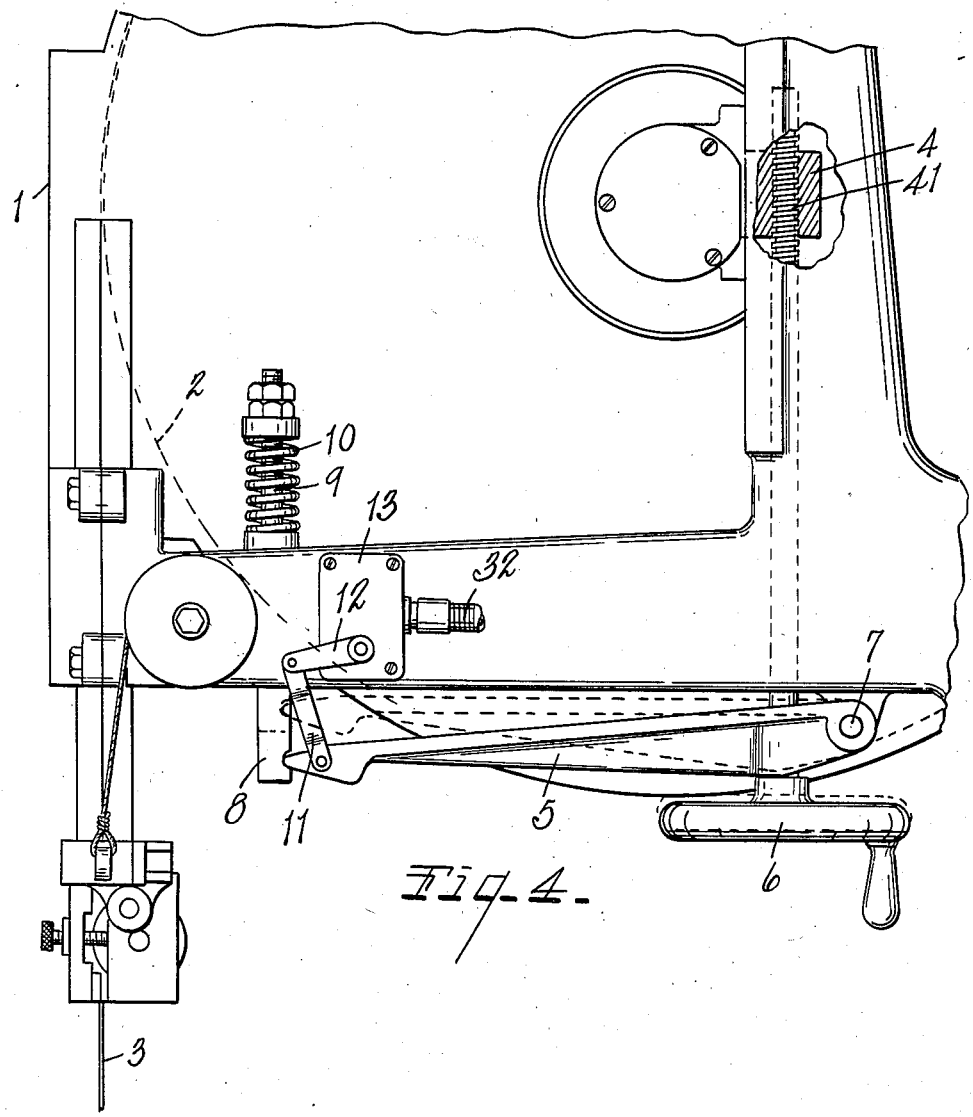

Patented June 16, 1942

2,286,589

UNITED STATES PATENT OFFICE 2,286,589

BLADE GRABBER FOR BAND SAWS

Carl E. Tannewitz, Grand Rapids, Mich.

Application October 28, 1940, Serial No. 363,142

10 Claims. (Cl. 143—157)

This invention relates to improvements in blade grabbers for band saws.

The main objects of this invention are:

First, to provide an improved automatically acting emergency safety mechanism for band saws, which is immediately effective upon breakage of the blade to halt further travel of the blade.

Second, to provide a blade grabber or clutching mechanism for band saws which comes into operation immediately upon breakage of the blade to stop the travel thereof.

Third, to provide a mechanism of the type described in combination with a band saw having automatic emergency brake applying equipment whereby not only is the operation of the driving instrumentalities for the saw immediately interrupted but the travel of the blade itself is positively halted.

Fourth, to provide a mechanism of the type described which is simple and economical in its parts and capable of ready installation on band saw machines of types now in quite extensive use.

Objects relating to details and economies of the invention will appear from the description to follow. The invention is defined in the claims:

A preferred embodiment of the invention is illustrated in the accompanying drawings, wherein:

Fig. 4 is a fragmentary view in side elevation partially broken away and in section, illustrating in solid and dotted lines certain parts illustrating the manner in which the mechanism of my invention comes into operation upon breakage of a saw blade so as to immediately halt further travel thereof.

Figure 1:
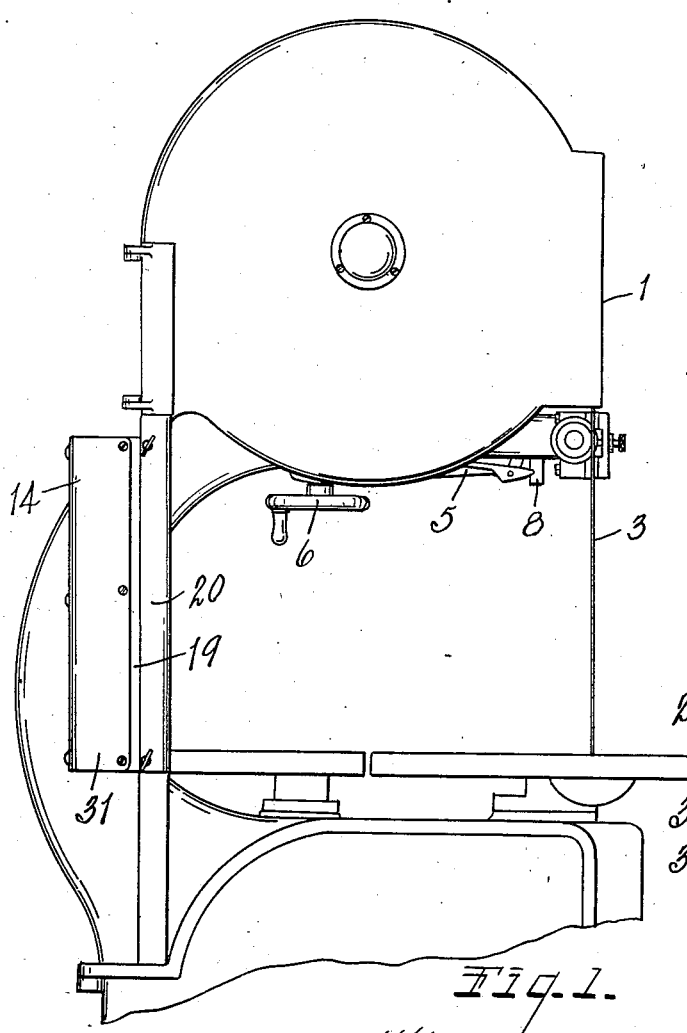
Fig. 1 is a fragmentary view in side elevation illustrating a band saw machine having a blade grabbing or clutching mechanism of my present invention associated therewith, various parts being shown conventionally in the drawings.

In De Groot Patent No. 1,927,203 of September 19, 1933, there is illustrated and described an automatic emergency safety device for band saws and the like which is effective immediately upon breakage of the blade of such a saw to apply a braking means to the band saw wheel and likewise cut off the drive therefor. While the device is very effective in operation for the purposes intended, there have been instances where the broken blade, traveling as it does at a high speed of possibly two miles per minute and having considerable momentum, continues to fly around inside the blade guards for a short time, with the possibility of threading out past the guards or through some small opening and stabbing or otherwise injuring a workman.

The present invention relates to a device which is preferably incorporated with such an automatic emergency brake arrangement and is therefore shown in combination with a braking mechanism in accordance with the teachings of my prior patent. This device is effective to seize or grab the blade immediately upon breakage thereof and stop its travel practically instantaneously. This is accomplished, moreover, without any particular damage to the blade itself, due to the arrangement of the clutching member. The damage is further minimized by the use of material such as relatively soft aluminum for the clutch jaws.

Referring to the drawings, the reference numeral 1 indicates a conventional band saw machine having associated therewith an emergency power cut-off and brake applying device, as described in the patent identified above. It is deemed unnecessary to illustrate and describe all the details of the aforesaid device. It will suffice to state that the upper wheel 2 about which the saw blade 3 is trained (see Fig. 4) is journaled in a slide which is adjustable vertically by means of the nut and screw arrangement generally indicated 4, the screw 41 of which is rotatably supported by a tension lever 5 and controlled by a hand wheel 6. In the embodiment shown, tension lever 5 is pivoted on the frame at 7 and supportingly engaged at its opposite end with a block 8 on a vertically slidable rod 9 which is urged upwardly by the relatively strong coil compression spring 10 coacting with a suitable part of the frame.

As described in the foregoing patent, when the blade 3 is tensioned about the band saw wheels therefor, the result is to bias the tension lever 5 downwardly to the position illustrated in solid lines in Fig. 4. Said lever occupies this position during the normal operation of the saw, but when the blade breaks, spring 9 elevates the same to the dotted line position of Fig. 4, with resultant upward actuation of a link 11 on the lever and rocking of an arm 12 which is pivotally connected to said link. The arm 12 controls a switch 13 to actuate suitable braking and cut-off instrumentalities as described in the patent referred to.

Figure 2:
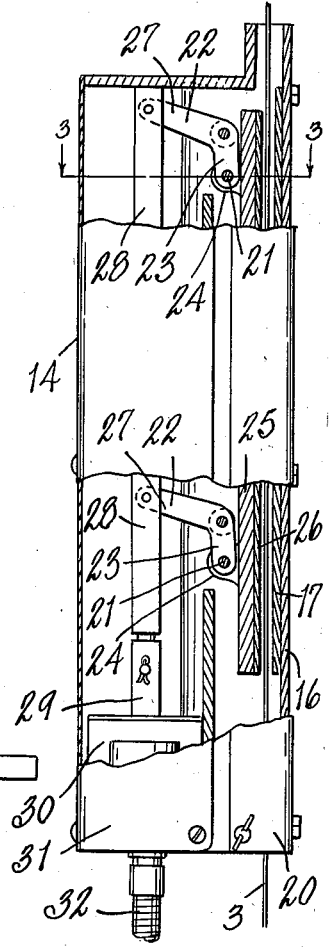
Fig. 2 is an enlarged fragmentary view partially broken away and in section on line 2—2 of Fig. 3, to illustrate details of the blade grabber or clutch of the mechanism.
Figure 3:
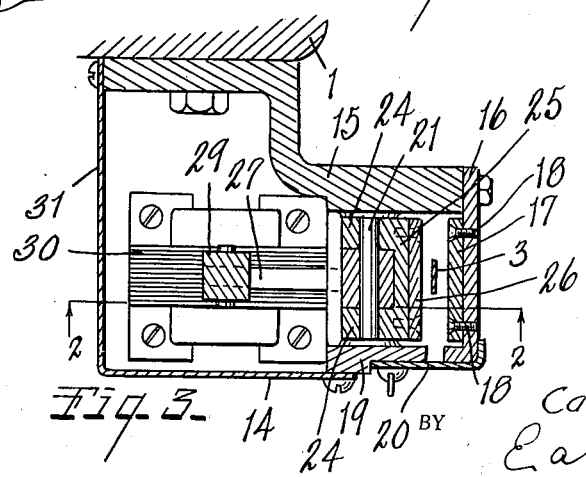
Fig. 3 is a fragmentary view further illustrating the blade grabber and operating device therefor in their relation to the saw blade.

Referring to Figs. 1, 2 and 3, wherein I illustrate the operating details of the blade saw clutch or grabber which is the subject matter of this invention, the reference numeral 14 denotes a closed elongated housing which is appropriately secured by bolts to the machine frame, this housing being disposed to the rear of the band saw wheel and taking the place of the usual rear guard for the blade. The housing is illustrated in Figs. 2 and 3 and comprises an angled vertically extending casting 15 bolted to the frame and having secured thereto a front plate 16 closing one side of the housing. This plate is disposed on one side of the blade 3 and serves as a fixed elongated jaw engageable with the blade. On the inner side of the thus constituted jaw 16 a grabber jaw facing 17 of aluminum or other relatively soft metal is attached by screws 18.

The reference numeral 19 designates a rigid mounting plate or bridge which extends vertically parallel to and spaced from the inner surface of the casting 15 and which may in fact be integral with the casting. It is joined to the front plate 16 by a suitable sheet metal closure 20. This plate 19 and casting 15 support a pair of vertically spaced transversely extending pivot pins 21 on each of which a bell crank 22 is pivoted. Each of the bell cranks has a short arm 23 disposed between and pivoted to a pair of ears 24 on a movable grabber jaw 25 provided with an aluminum jaw facing 26 coacting with the jaw facing 17, the jaws being operative to seize the blade 3 when actuated following breakage of the latter. Each of the bell cranks 22 has a relatively long arm 27 pivotally connected at its end to an elongated vertically shiftable link 28 in the housing 14, and the link is in turn connected to the core 29 of a solenoid generally designated 30, whereby upon downward actuation of the solenoid core 29, the bell cranks 22 are rocked in counterclockwise direction to shift the movable grabber jaw into operative blade engaging relation to thereby seize and halt the blade 3. The coil of the solenoid is electrically connected to switch 13 for energization when the switch contact is made. This, as described above, takes place upon breakage of the saw and elevation of the tension arm 5.

A suitable spring (not shown) is preferably employed to bias the grabber actuating link 28 in the opposite direction to its direction of actuation by the solenoid, so as to maintain the jaws properly separated when not in operation.

The grabber jaw housing 14 is provided with a sheet metal cover plate 31 and solenoid 30 is connected to the switch 13 by a suitable cable 32. With reference to switch 13, the same is a conventional push button type. Obviously, the functions of completing an energizing circuit for the solenoid 30 and for halting the operation of the band saw motor and braking the blade guide wheel, as described in my patent, may be incorporated in a single switch or, if desired, separate individual switches may be employed for this purpose.

It is desired to point out that the fact that the facings 26, 17 for the band saw grabbing jaws are of a relatively soft material such as aluminum enables the halting of the blade to take place without undue damage thereto.

From the foregoing, it will be appreciated that I have shown and described a device or mechanism which is instantaneously operative to stop the travel of a broken saw blade and eliminate the considerable danger represented thereby. The parts are simple and economical in construction and may be installed with little or no modification on existing band saws.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In combination with a band saw, a pair of relatively movable jaws disposed on opposite sides of the blade of said saw and adapted to seize and halt movement thereof upon breakage of the blade, a solenoid means operatively connecting the same to one of said jaws to actuate the jaws to blade seizing position upon energization of the solenoid, a switch controlling energization of the solenoid, and means controlled by the tension of said blade and operatively connected to said switch to actuate the latter upon sudden diminishing of said tension due to breakage of the blade, to thereby energize the solenoid and actuate the jaws to their relative blade seizing position.

2. In combination with a band saw, a pair of relatively movable jaws disposed on opposite sides of the blade of said saw and adapted to seize and halt movement thereof upon breakage of the blade, electrically energizable means operatively connected to one of said jaws to actuate the jaws to blade seizing position upon energization of said means, a switch controlling energization of said means, and means controlled by the tension of said blade and operatively connected to said switch to actuate the latter upon sudden diminishing of said tension due to breakage of the blade, to thereby energize said electrically energizable means and actuate the jaws to their relative blade seizing position.

3. A band saw blade grabber comprising a housing adapted to be mounted on a band saw and having an opening through which the blade of the saw passes in operation, said housing having a fixed soft metal faced jaw therein disposed on one side of the blade, a further movable soft metal faced jaw adapted to coact with said first named jaw in halting the travel of the blade when the latter is broken, a pair of bell cranks pivotally connected to said housing, each having an arm pivotally connected to said movable jaw, a vertically shiftable link pivotally connected to the respective other arms of said cranks, a solenoid operatively connected to said link to actuate the same when energized and thereby rock the cranks and approach said movable jaw toward the fixed jaw to seize and halt travel of the blade, a switch controlling the energization of said solenoid, and means controlled by the tension of said blade and operative when said tension is suddenly diminished by breakage of the blade to actuate said switch for energization of the solenoid.

4. A band saw blade grabber comprising a support, a fixed jaw on said support disposed on one side of the blade, a further movable jaw adapted to coact with said first named jaw in halting the travel of the blade when the latter is broken, a pair of bell cranks pivotally connected to said support, each having an arm pivotally connected to said movable jaw, a vertically shiftable link pivotally connected to the respective other arms of said cranks, a solenoid operatively connected to said link to actuate the same when energized and thereby rock the cranks and approach said movable jaw toward the fixed jaw to seize and halt travel of the blade, a switch controlling the energization of said solenoid, and means controlled by the tension of said blade and operative when said tension is suddenly diminished by breakage of the blade to actuate said switch for energization of the solenoid.

5. A band saw grabber comprising a support, a jaw in said support disposed on one side of the blade, a jaw adapted to coact with said first named jaw in halting the travel of the blade when the latter is broken, a pair of bell cranks pivotally connected to said support, each having an arm pivotally connected to one of said jaws, a vertically shiftable link pivotally connected to the respective other arms of said cranks, a solenoid operatively connected to said link to actuate the same when energized and thereby rock the cranks and approach said jaws to seize and halt travel of the blade, a switch controlling the energization of said solenoid, and means controlled by the tension of said blade and operative when said tension is suddenly diminished by breakage of the blade to actuate said switch for energization of the solenoid.

6. A band saw blade grabber comprising a housing adapted to be mounted on a band saw and having an opening through which the blade of the saw passes in operation, a pair of relatively movable jaws on said housing disposed on opposite sides of the blade and coacting when actuated in seizing and halting the travel of the blade upon breakage of the latter, shiftable means connected to at least one of said jaws and effective to actuate the same to operative blade seizing position, electrically energizable means operatively connected to said shiftable means to actuate the same when energized and thereby actuate said jaws to seize the blade, a switch controlling the energization of said electrically energizable means, and means controlled by the tension of said blade and operative to actuate said switch for electrical energization of said means when said tension is suddenly diminished as by breakage of the blade.

7. A band saw blade grabber comprising a support, a pair of relatively movable jaws on said support disposed on opposite sides of the blade and coacting when actuated in seizing and halting the travel of the blade upon breakage of the latter, means connected to at least one of said jaws and effective to actuate the same to operative blade seizing position, electrically energizable means operatively connected to said last named means to actuate the same when energized and thereby actuate said jaws to seize the blade, a switch controlling the energization of said electrically energizable means, and means to actuate said switch for electrical energization of said means when the blade tension is suddenly diminished as by breakage of the blade.

8. In a structure of the class described, the combination of a driven band saw blade normally under driving tension, means for tensioning and driving the blade, coacting relatively movable blade clutching jaws disposed in opposed relation on opposite sides of the normal path of travel of the blade and normally out of engagement therewith, and means operatively associated with the blade tensioning means and operatively associated with and actuating at least one of said jaws, said means being actuated by said tensioning and driving means whereby on the breaking of the band saw, the jaws are automatically moved relative to one another to blade clutching relation.

9. In a structure of the class described, the combination with a driven band saw blade, and driving and tensioning members therefor, of coacting blade clutching jaws disposed in opposed relation on opposite sides of the normal path of travel of the blade and normally out of engagement therewith, and means operatively associated with the blade tensioning and driving means and operatively associated with and actuating at least one of said jaws, said means being actuated by said tensioning and driving means on the breaking of the band saw blade, whereby such jaw is automatically actuated to clutch the blade between the jaws.

10. In a device of the class described, the combination with a band saw machine including a band saw blade and driving and tensioning means therefor, said tensioning means including means instantaneously movable upon breakage of said blade and consequent loss of tension therein of a pair of relatively movable jaws disposed on opposite sides of the normal path of travel of said blade and coacting when actuated to clutch the blade, and a jaw control device including control means actuated by said instantaneously movable means upon movement thereof in response to breakage of a blade, and further means actuated by said control means and operatively connected with at least one of said jaws to effect relative movement of the jaws to blade clutching position upon the breaking of the blade.

CARL E. TANNEWITZ.